June 4, 1957  W. M. BOREN  2,794,344
PIPE LINE SAMPLER
Filed June 8, 1953  2 Sheets-Sheet 2
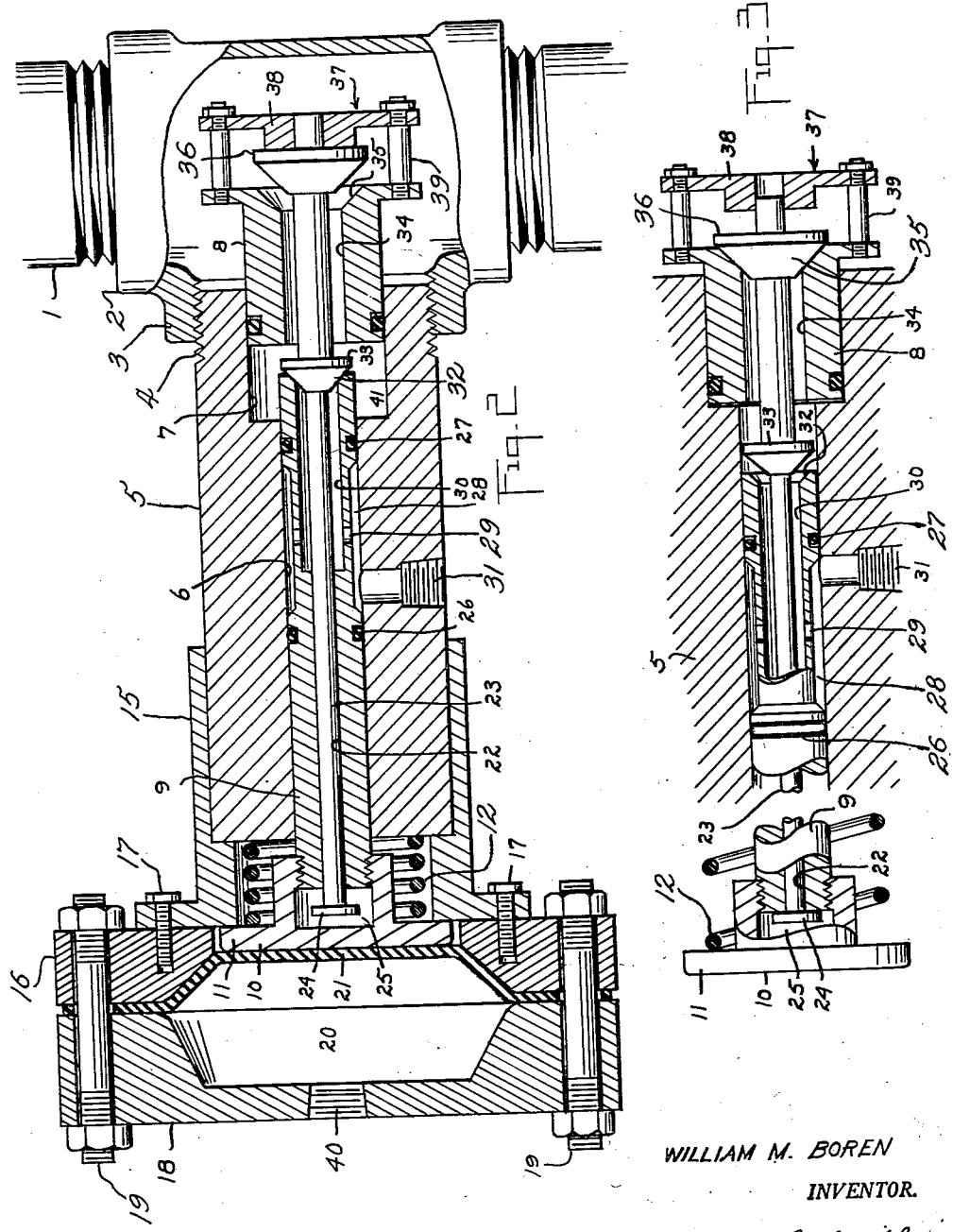
WILLIAM M. BOREN
INVENTOR.
BY Ray L. Smith
ATTORNEY

United States Patent Office 2,794,344
Patented June 4, 1957

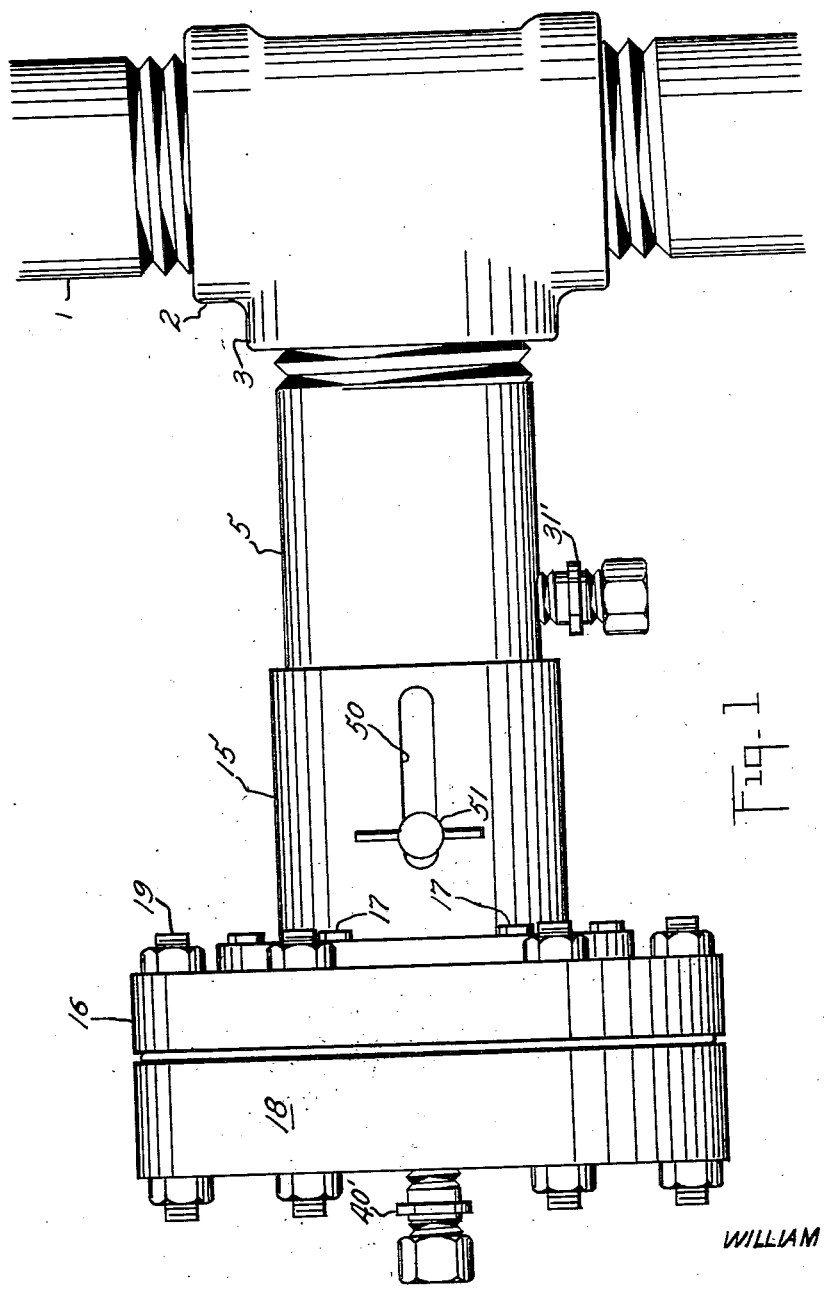

2,794,344

PIPE LINE SAMPLER

William M. Boren, Harris County, Tex., assignor, by mesne assignments, to Rolo Manufacturing Company, Houston, Tex., a corporation of Texas Application June 8, 1953, Serial No. 360,151

4 Claims. (Cl. 73—422)

This invention relates to a device for obtaining samples of a fluid flowing in a conduit or pipe line, for the purposes of determining the content of the fluid.

The invention is of particular utility in connection with the petroleum industry where fluids of varying content pass through a pipe line, as for example fluids from a producing well which may contain petroleum, salt water, sedimentary material, and the like. It is also of utility on cross country pipe lines which at different times carry different fluids, the device being used to determine when a change in liquid passes a given point and the extent of admixture of liquids during the transition period. While these fields of use are mentioned specifically, it is to be understood that the invention may be used in any environment where it is desired to obtain samples of a fluid flowing within a pipe line.

It is an object of the invention to provide a device of the type described which is simple and inexpensive to construct, operate and maintain and which constitutes effective means for obtaining desired samples.

Another object is to provide a sampling device that may safely be installed upon and obtain samples from a pipe line in which the sampled fluid is transmitted under relatively high pressures.

Still another object is to provide a device capable of collecting a sample from beneath the free surface of a liquid to be sampled.

A still further object is to provide a sampler which first isolates a sample, or increment of sample, from a body of fluid to be sampled and thereafter forcibly ejects such sample from within the device.

Still another object is to provide a sampling device capable of obtaining sample increments so that a composite sample over a selected interval of time will indicate the average content of the fluids passing through the pipe line during such interval.

The foregoing objects, together with other objects, will be more fully apparent from the following description considered in connection with the accompanying drawings in which:

Fig. 1 is an elevational view of one form of the invention connected in a pipe line carrying fluid to be sampled;

Fig. 2 is a longitudinal sectional view of the device, showing parts in their relative positions when a sample is segregated from the fluid stream and ready for removal for such analyses as desired;

Fig. 3 is a partial sectional view, similar to that shown in Fig. 2, but showing the relative positions of parts when a sample has been discharged to the exterior of the device.

In the drawing the pipe line 1 carrying a fluid to be sampled is shown as provided with an adapter coupling 2 having a boss 3 threaded internally to receive the threaded end portion 4 of the housing 5 of the device. The housing has a central bore 6 counterbored at 7 thereby providing a cylinder to slidably and sealably receive the displacement piston 8. A plunger 9 extends outwardly through the bore 6 and is threadedly attached to the base 10 having an annular flange 11 for engagement with the compression spring 12 having its opposite end in engagement with the end of the housing 5.

A flanged sleeve 15 slidably fits about the outer end of the housing 5 and carries a flange 16 which is secured thereto by means of cap screws 17. A complementary flange 18 is secured to flange 16 by bolts 19, and these flanges are hollowed out centrally to form the diaphragm chamber 20 within which the diaphragm 21 is adapted to move.

The plunger 9 has an axial bore 22 which slidably receives the valve stem 23 provided with a head 24 in the chamber 25 within the base 10, it being apparent that this construction provides a loose connection between the plunger and the valve stem to serve a purpose that will be presently explained.

The plunger 9 has spaced peripheral seals 26 and 27 in contact with the housing 5 outwardly and inwardly, respectively, from a peripheral groove 28 on the plunger. Radial ports 29 in the plunger form a passageway between the groove 28 and a counterbore 30 in the inner end of the plunger. In turn, a port 31 in the wall of the housing forms a passageway to the exterior of the housing. A fitting, such as is shown at 31' in Fig. 1 is desirably secured in the port 31 so that a conduit may be attached to conduct the sample material to a desired point and receptacle. The counterbore 30 has a valve seat 32 at its outer end for engagement by the valve 33 carried by the valve stem 23.

The displacement piston 8 has a central bore 34 through which the valve stem 23 passes, and a valve seat 35 at the outer end of this bore is engageable by the valve 36 which is also mounted upon the valve stem 23 but in spaced relation with the valve 33 thereon. A stop 37 on the innermost end of the displacement piston comprises plate or disc 38 interconnected with the piston by spacer lugs 39.

In order to further describe the disclosed embodiment of the invention and to explain the mode of operation thereof, it is pointed out that the flange 18 is provided with a port 40 to which may be connected, as by fitting 40' (Fig. 1), a source of pressure fluid so that the diaphragm 21 may be forced inwardly to move the plunger assembly to the position shown in Fig. 2. Any suitable source of pressure fluid, or other mechanism to move the plunger assembly inwardly, may be used the only requirement being that the movement of the plunger assembly be had at desired predetermined intervals so that fluid samples, or increments of a fluid sample may be obtained.

When the diaphragm 21 is moved towards its innermost position, shown in Fig. 2, the base 10 and, hence, the plunger 9 are moved therewith. Because of fluid pressure exerted against the outer face of valve 36 the valve stem does not move with the plunger 9 until the valve 33 engages its seat 32. Thus the valve 36 is not opened until after the valve 33 is closed. After engagement of valve 33 by the plunger 9 the valve stem is moved with the plunger until the valve 36 engages the stop 37 and moves the displacement piston to an extended position (Fig. 2) whereby a predetermined volume of fluid is admitted to chamber 41 through open valve 36 and axial bore 34. Also, the valve 33 is in engagement with its seat 32 and hence there can be no leakage of fluid beyond the valve 33 or the seal 27. It is thus apparent that the device is capable of preventing any leakage even though the fluid in the pipe line 1 may be conducted therethrough under high pressure.

Pressure upon the diaphragm 21 is next released whereupon the spring 12 moves the plunger assembly outwardly. Because of fluid pressure exerted against the outer face of valve 33 urging it into engagement with its seat, the valve stem initially moves with the plunger 9 causing the valve 36 to move into engagement with its seat 35 before the valve 33 is unseated. Thus, for a brief instant, the fluid within the chamber 41 is entrapped. With the chamber 41 closed, however, fluid pressure therein resists movement of the piston 8 and, of course, the valve stem 23 by virtue of the engagement of valve 36 with its seat 35. Thus, continued movement of the plunger 9 draws the valve seat 32 away from the valve 33 to permit the fluid to escape from the chamber 41. As the entire plunger assembly, including the displacement piston continues to move to the left as viewed in Fig. 1, the entrapped fluid is forced out of the chamber 41 through counterbore 30, ports 29 and the annulus formed by the groove 28 to port 31 and thence to a suitable container (not shown) for receiving the sample.

During the period of removal of the sample from the chamber 41, the plunger 9 moves relative to the valve stem 23 until the head 24 engages the end of the plunger. Thereafter the entire plunger assembly, including the valve stem, valves and displacement piston, moves until the complete sample, previously entrapped within the chamber 41, is discharged and the parts of the device are in the relative positions shown in Fig. 3. The device is then in condition for the succeeding stroke which takes place when pressure fluid is again introduced to the chamber 20 to move the diaphragm 21 and associated parts of the device to the positions shown in Fig. 2.

It is to be noted that the sample is forcibly ejected as the assembly moves, to the left as seen in Fig. 2, under the influence of spring 12. Also, it seems apparent that the device may be used in obtaining samples from a body of liquid by merely submerging the inner end of the body 5 beneath the free surface of the liquid and then carrying out cyclic operations as just described.

It is desirable that a selected predetermined quantity of sample fluid may be had from each cyclic operation of the device as above explained. In order that the volume per cycle may be preselected, I provide the sleeve 15 with a slot 50 (Fig. 1) through which extends a stud anchored in the wall of the body 5 and provided with a wing nut 51. This enables selective adjustment of the sleeve axially on the housing 5 and hence the axial length of the sample chamber 41 is adjusted to suit needs.

While the disclosed embodiment of the invention has been described as a pipe line sampler, this terminology refers to a particular use, as illustrative, it being apparent that the device may be used for obtaining samples of fluids from tanks and other containers having fluids therein. Alternately, as already indicated, the inner end of the device may be immersed beneath the free surface of a liquid so that actuation will cause sample increments to be segregated and forced through port 31 and thence to the container provided therefor.

The invention claimed is:

1. A sample taking device comprising, a housing having an axially extending bore, a piston in said bore at the entrance end thereof, said piston having a fluid intake passage bored axially therethrough, a tubular plunger in the bore at the exit end thereof, a valve stem extending through said plunger and said piston, spaced intake and outlet valve members on said valve stem and cooperating valve seats on the entrance ends of said piston and plunger respectively, means to move said plunger in one axial direction to first seat said outlet valve member and thereby to then move said valve stem therewith to unseat said intake valve member, and means to move said plunger and said valve stem in the opposite axial direction.

2. A sample taking device comprising a housing having an axially extending bore, a piston in the bore at the entrance end thereof, said piston having a fluid intake passageway bored axially thereof, a tubular plunger in the bore at the exit end thereof, a valve stem extending through said plunger and said piston, an outlet valve member on said valve stem and a cooperating valve seat on the entrance end of said plunger, an intake valve member on said valve stem and a cooperating valve seat on the entrance end of said piston, stop means mounted on the entrance end of said piston in the path of movement of said intake valve member, means to move said plunger axially towards said piston to first seat said outlet valve member and thereby subsequently to carry said valve stem therewith to move said intake valve member from its seat into engagement with said stop means and move said piston therewith to its extended position, and resilient means to move said plunger and said valve stem in the opposite direction to first reseat said intake valve member and to then unseat said outlet valve member and return said piston to its normal, retracted position.

3. A sample taking device comprising a housing, said housing having a longitudinal bore therein, said bore having an enlarged portion at the entrance end thereof forming a sample receiving cylinder within the housing, a piston in said cylinder, said piston having an axial fluid intake passage therethrough, a tubular plunger slidably mounted in said longitudinal bore at the exit end thereof, a valve stem slidably mounted in said plunger to extend through said piston, an intake valve member mounted on said valve stem and a cooperating valve seat at the entrance end of said piston, an outlet valve member mounted on said valve stem and a cooperating valve seat on the entrance end of said plunger, said piston being adapted to be moved in either axial direction by engagement of said intake valve member, means to move said plunger axially toward said piston to first seat said outlet valve member and to then move said valve stem therewith to unseat said intake valve member and move said piston to its extended position, and additional means to move said plunger in the opposite direction to first seat said intake valve member and to then unseat said outlet valve member and return said piston to its retracted position.

4. A sample taking device comprising a housing having a longitudinal bore therein, a valve body within said bore at the entrance end thereof, said valve body having an axial intake passage therethrough, a tubular plunger in the bore at the exit end thereof, a valve stem within said bore extending through said valve body, spaced intake and outlet valve members on said valve stem and cooperating valve seats on the entrance ends of said valve body and plunger respectively, means operable in sequence to move said plunger axially toward the entrance end of said bore to seat said outlet valve member and thereby to move said valve stem to unseat said inlet valve member and introduce a fluid sample between said inlet and outlet valve members, and additional means to move said plunger in the opposite direction, said outlet valve remaining seated under fluid pressure to move said valve stem with said plunger until further movement of said valve stem is prevented by seating of said inlet valve member, and thereafter being unseated to discharge the fluid sample.

References Cited in the file of this patent

UNITED STATES PATENTS

| | | |
|---|---|---|
| 1,462,445 | Delaney | July 17, 1923 |
| 1,538,911 | Taylor | May 26, 1925 |
| 1,966,712 | Fisher et al. | July 17, 1934 |
| 2,012,836 | Talbot et al. | Aug. 27, 1935 |
| 2,646,025 | Deardorff | July 21, 1953 |